United States Patent
Matsuo et al.

(10) Patent No.: US 11,302,020 B2
(45) Date of Patent: Apr. 12, 2022

(54) STEREO CAMERA DEVICE

(71) Applicant: HITACHI AUTOMOTIVE SYSTEMS, LTD., Hitachinaka (JP)

(72) Inventors: Shigeru Matsuo, Tokyo (JP); Manabu Sasamoto, Tokyo (JP); Shinichi Nonaka, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 16/964,221

(22) PCT Filed: Jan. 31, 2019

(86) PCT No.: PCT/JP2019/003287
§ 371 (c)(1),
(2) Date: Jul. 23, 2020

(87) PCT Pub. No.: WO2019/167531
PCT Pub. Date: Sep. 6, 2019

(65) Prior Publication Data
US 2021/0042945 A1   Feb. 11, 2021

(30) Foreign Application Priority Data
Feb. 28, 2018   (JP) .............................. JP2018-034211

(51) Int. Cl.
*G06T 7/10*   (2017.01)
*G06T 7/50*   (2017.01)
(Continued)

(52) U.S. Cl.
CPC ............. *G06T 7/50* (2017.01); *B60W 40/072* (2013.01); *B60W 40/105* (2013.01); *G06T 7/10* (2017.01);
(Continued)

(58) Field of Classification Search
CPC ........... G06T 1/00; G06T 7/10; B60W 40/072
See application file for complete search history.

(56) References Cited

FOREIGN PATENT DOCUMENTS

JP   2001-041741 A   2/2001
JP   2001041741   *   2/2001   ............... G06T 1/00
(Continued)

OTHER PUBLICATIONS

International Search Report, PCT/JP2019/003287, dated May 21, 2019, 1 pg.

*Primary Examiner* — Myron Wyche
(74) *Attorney, Agent, or Firm* — Volpe Koenig (57) ABSTRACT

An objective of the present invention is, in a stereo camera device, to determine an accurate image position in a direction of progress to detect at an early stage an obstacle or a preceding vehicle on a road. Provided is a stereo camera device for measuring the distance to a solid object from images photographed with a plurality of cameras, said device characterized by: a wide-angle image cropping part for cropping a portion of the images; a distance image cropping part for cropping and enlarging a portion of the images; a road shape determination part for determining a road shape, including slope information, of a road being traveled; and determining, on the basis of the road shape in a prescribed distance, which has been derived with the road shape determination part, the cropping position and/or range of the distance image cropping part.

6 Claims, 10 Drawing Sheets

(51) Int. Cl.
*B60W 40/072* (2012.01)
*B60W 40/105* (2012.01)

(52) U.S. Cl.
CPC ............... *G06T 2207/10012* (2013.01); *G06T 2207/30256* (2013.01)

(56) References Cited

FOREIGN PATENT DOCUMENTS

| | | | | | |
|---|---|---|---|---|---|
| JP | 2012-198077 | A | 10/2012 | | |
| JP | 2015-144407 | A | 8/2015 | | |
| JP | 2016-057221 | A | 4/2016 | | |
| JP | 2016057221 | * | 4/2016 | ............. | G01C 21/26 |
| JP | 2015144407 | * | 8/2016 | ............... | G06T 1/00 |
| JP | 2017-062638 | A | 3/2017 | | |
| JP | 2017062638 | * | 3/2017 | ............... | G06T 1/00 |

* cited by examiner

STEREO CAMERA DEVICE

TECHNICAL FIELD

The present invention relates to an in-vehicle stereo camera device that recognizes an obstacle outside a vehicle by using a plurality of cameras.

BACKGROUND ART

In order to improve traveling safety of a vehicle, a system that detects an obstacle forward of the vehicle by a camera installed in the vehicle and warns a driver or automatically applies a brake when there is a possibility of collision with the obstacle has been researched.

Examples of a sensor that monitors a scene forward of the vehicle include a millimeter wave radar, a laser radar, and a camera. Types of the camera include a monocular camera and a stereo camera using a plurality of cameras. The stereo camera can measure a distance to an object captured by using disparity of an overlapping region captured by the two cameras at a predetermined interval. Thus, it is possible to accurately grasp a degree of risk of collision with the object forward of the vehicle.

The stereo camera obtains disparity between images captured by two cameras, and converts the disparity into a distance. There is a feature that the disparity becomes smaller as a measurement distance becomes farther. PTL 1 proposes a method of enlarging an image of a central portion in order to widen a measurement range to the distant. PTL 2 proposes a method of performing disparity calculation by cropping an image in a traveling direction by a steering angle of a steering wheel of a traveling vehicle or a white line on a road surface.

CITATION LIST

Patent Literature

PTL 1: JP 2012-198077 A
PTL 2: JP 2017-62638 A

SUMMARY OF INVENTION

Technical Problem

In PTL 1, the disparity calculation is performed by enlarging a part near the center of the image captured by the camera. However, there is a problem that a traveling destination is not enlarged when a destination of a traveling road is curved and the traveling direction is out of the center of the image.

Thus, when the method of PTL 2 is applied as a method of determining an image position to be enlarged, since the image position based on the steering angle of the steering wheel is obtained, there is a problem that a road ahead of the curve cannot be processed in a state in which the steering wheel still faces forward of a straight line before the vehicle enters the curve. The method of deciding the road shape based on the white line cannot be applied to the road having no white line. There is a problem that the gradient of the road cannot be accurately determined even though the road has the white line.

An object of the present invention is to decide an accurate image position in a traveling direction in a stereo camera device in order to detect an obstacle or a preceding vehicle on a road at an early stage.

Solution to Problem

In order to solve the above problems, the present invention relates to a stereo camera device that measures a distance of a three-dimensional object from images captured by a plurality of cameras. The device includes a wide-angle image cropping unit that crops a part of the image, a distant image cropping unit that crops a part of the image, and enlarges the cropped part, and a road shape determination unit that determines a road shape including gradient information of a road on which a vehicle is traveling. At least any one of a cropping position and a cropping range of the distant image cropping unit is decided based on the road shape at a predetermined distance which is obtained by the road shape determination unit.

Advantageous Effects of Invention

According to the present invention, there are effects that it is possible to accurately decide an accurate image position in a traveling direction based on information on a shape and a gradient of a road, and it is possible to detect an obstacle or a preceding vehicle in the distance on a traveling road.

DESCRIPTION OF EMBODIMENTS

Hereinafter, an embodiment of the present invention will be described with reference to the drawings. The following description illustrates specific examples of contents of the present invention, and the present invention is not limited to these descriptions, and is variously changed and modified by those skilled in the art within technical ideas disclosed in the present specification. In all the drawings for describing the present invention, components having the same function are denoted by the same reference signs, and repeated description thereof may be omitted.

First Embodiment

Figure 1:
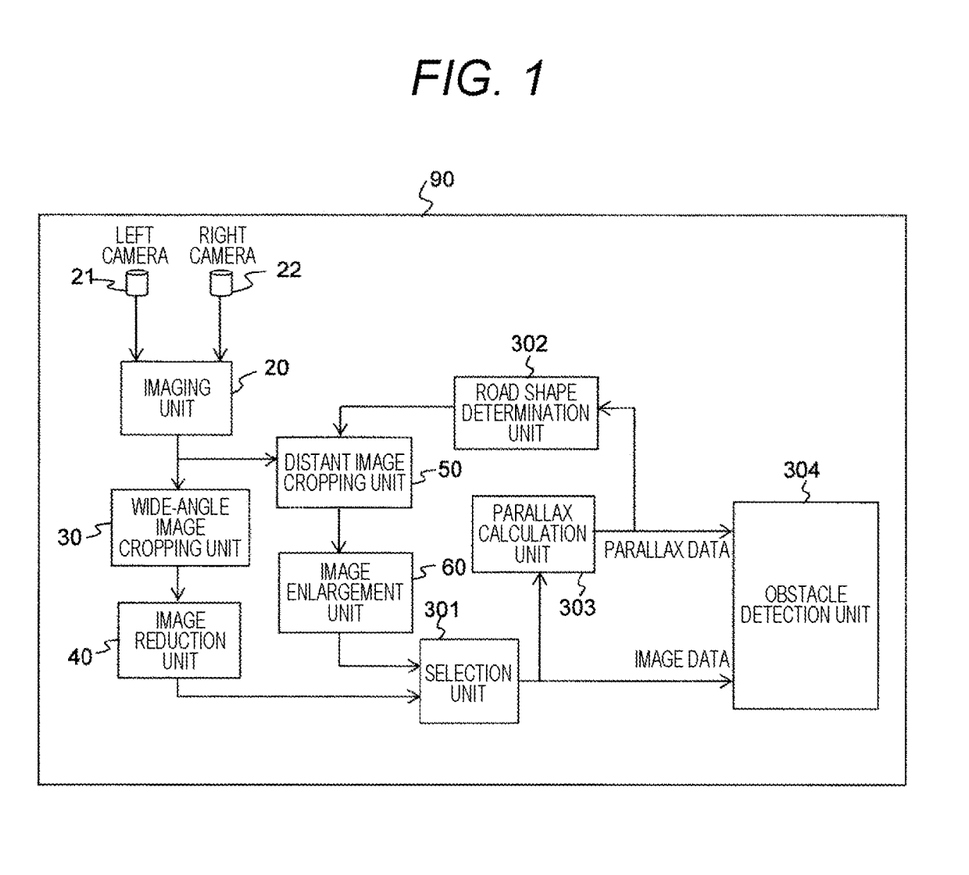
FIG. 1 is a functional block diagram of a stereo camera device.

FIG. 1 is a functional block diagram of a stereo camera device 10. An imaging unit 20 is connected to two cameras of a right camera 22 and a left camera 21. The imaging unit 20 corrects luminance of images captured by the left camera 21 and the right camera 22, removes noises of the images, corrects distortions of the images, and transfers the images to a wide-angle image cropping unit 30. The wide-angle image cropping unit 30 reduces the left and right images sent from the imaging unit 20, and crops, as a wide-angle image, an image in a specific range. In this cropping range, an image having a wide range is cropped in order to cover a wide-angle area. With a reduction ratio in the reduction processing, the image is reduced within a range in which a disparity image at a short distance can be generated from the wide-angle image. In this example, a range of the short distance is 30 m, and the reduction ratio is ½. The left and right wide-angle images generated in this manner are selected by a selection unit 301, and then a disparity calculation unit 303 generates disparity data. A road surface on which a vehicle is traveling is extracted from the disparity data of the wide-angle images, and a three-dimensional shape including gradient information ahead of the road surface by a predetermined distance is determined. A cropping position of a distant image is decided according to the road surface shape.

The predetermined distance of this distant image needs to be a distance measurable by a stereo camera, and is 150 m in this example. A distant image cropping unit 50 crops the distant image from the left and right images of the imaging unit according to the cropping position of the distant image decided in this manner. The distant image enlarges the image in order to improve distance measurement performance. An enlargement rate is double. The enlarged distant image is selected by the selection unit 301, and is sent to the disparity calculation unit 303. Thus, disparity data of the distant image is generated. An obstacle detection unit 304 detects an obstacle on a road and a preceding vehicle by using the images and the disparity data.

Figure 2:
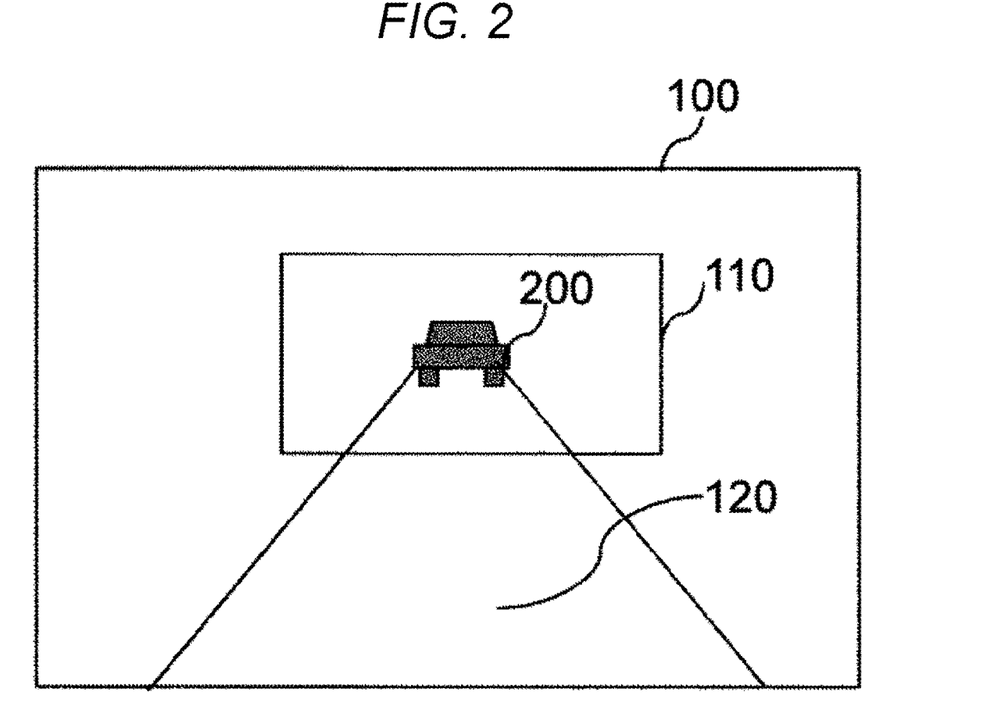
FIG. 2 is a diagram illustrating an example in which a wide-angle image and a distant image are cropped.

FIG. 2 illustrates an example in which the wide-angle image and the distant image are cropped. A road 120 and a preceding vehicle 200 are captured on a wide-angle image 100. The distant image 110 crops a portion ahead of the road 120 by 150 m. The stereo camera has a limit to a distance measurable in the distance, and in this example, a limit distance is set to 150 m. Thus, the cropping position of the distant image needs to be the portion ahead of the road by 150 m. This distant image 110 is enlarged double, and disparity calculation is performed.

Figure 3:
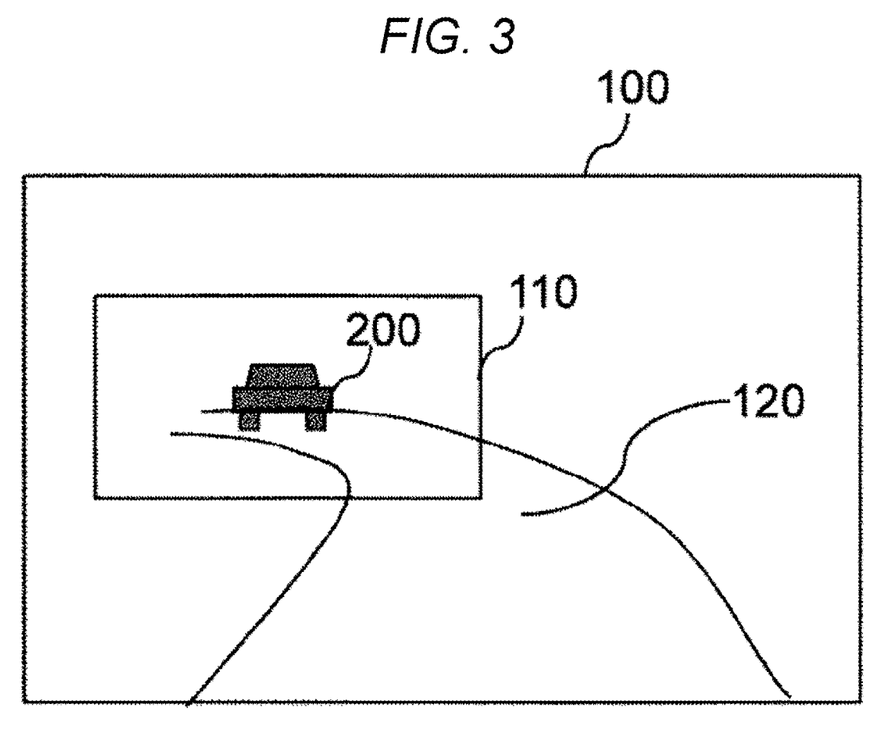
FIG. 3 is a diagram illustrating an example in which the distant image is cropped when a distant portion curves to the left.

FIG. 3 illustrates an example in which the distant image 110 when a distant portion of the road 120 curves to the left. A road shape determination unit 302 determines the road surface shape of the road 120 by using the disparity image generated from the wide-angle image 100, and decides the cropping position of the distant image 110. In FIG. 3, the cropping position of the distant image 110 is further shifted to the left than the position of FIG. 2 according to a curve shape of the road 120. By doing so, it is possible to add the road 120 on which the vehicle is traveling to the distant image 110, and it is possible to detect the preceding vehicle 200 that is traveling on the road 120.

Figure 4:
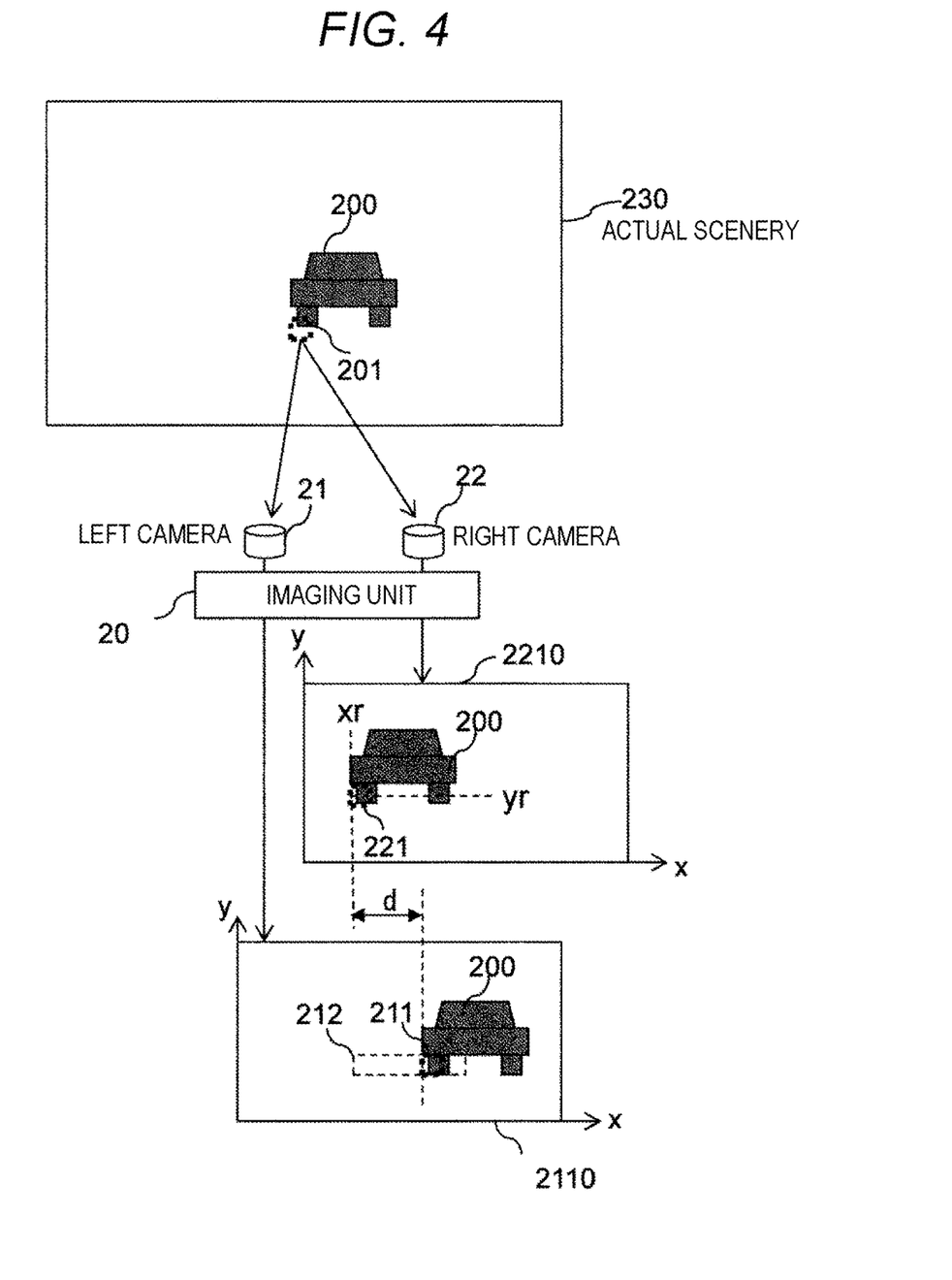
FIG. 4 is an explanatory diagram of disparity calculation processing.

FIG. 4 illustrates disparity calculation processing of the disparity calculation unit 303. The image captured by the right camera 22 is used as a reference image, and a criterion block image 221 having, for example, 8 pixels×8 pixels is defined. A size of the block image is not limited to this example. Meanwhile, a reference image 212 having a search width (for example, 128 pixels) is selected from the image captured by the left camera 21 by using the same vertical position (Y coordinate) and horizontal position (X coordinate) as the criterion block image 221 as a criterion. Thereafter, a difference between the criterion block image 221 and the reference image is calculated. This difference calculation is called SAD, and the following calculation is performed.

[Equation 1]

$$SAD = \Sigma\Sigma |I(i,j) - T(i,j)| \qquad \text{Equation (1)}$$

However, I is an image block (for example: 8×8 pixels) in the reference image, T is image data of the criterion block image 221, and i and j are coordinates in the image block. In order to calculate one disparity, the calculation is performed by the search width while shifting a reference position of the reference image pixel by pixel, and a position at which a SAD value is the smallest is searched for.

An actual scenery 230 seen from a windshield of the vehicle illustrated in FIG. 2 has the preceding vehicle 200. When there are a right image 2210 captured by the right camera 22 and a left image 2110 captured by the left camera 21, a part 201 of the preceding vehicle 200 is captured at a position of the position 221 on the right image 2210, and is captured at a position of the position 211 on the left image 2110. As a result, a disparity d occurs between the position of the criterion block image 221 and the reference block image 211. This disparity d has a large value when the preceding vehicle 200 is close to the stereo camera device 10, and has a small value when the preceding vehicle is distant from the stereo camera device. The disparity obtained in this manner is obtained for the entire image. Due to the use of this disparity d, a distance to the stereo camera device 10 can be measured by the principle of triangulation. A distance Z is calculated from the disparity d by the following Equation.

$$Z = (f \times B)/d \qquad \text{Equation (2)}$$

Here, f is a focal distance of the right and left cameras, and B is a distance (baseline length) between the right camera 22 and the left camera 21.

Figure 5:
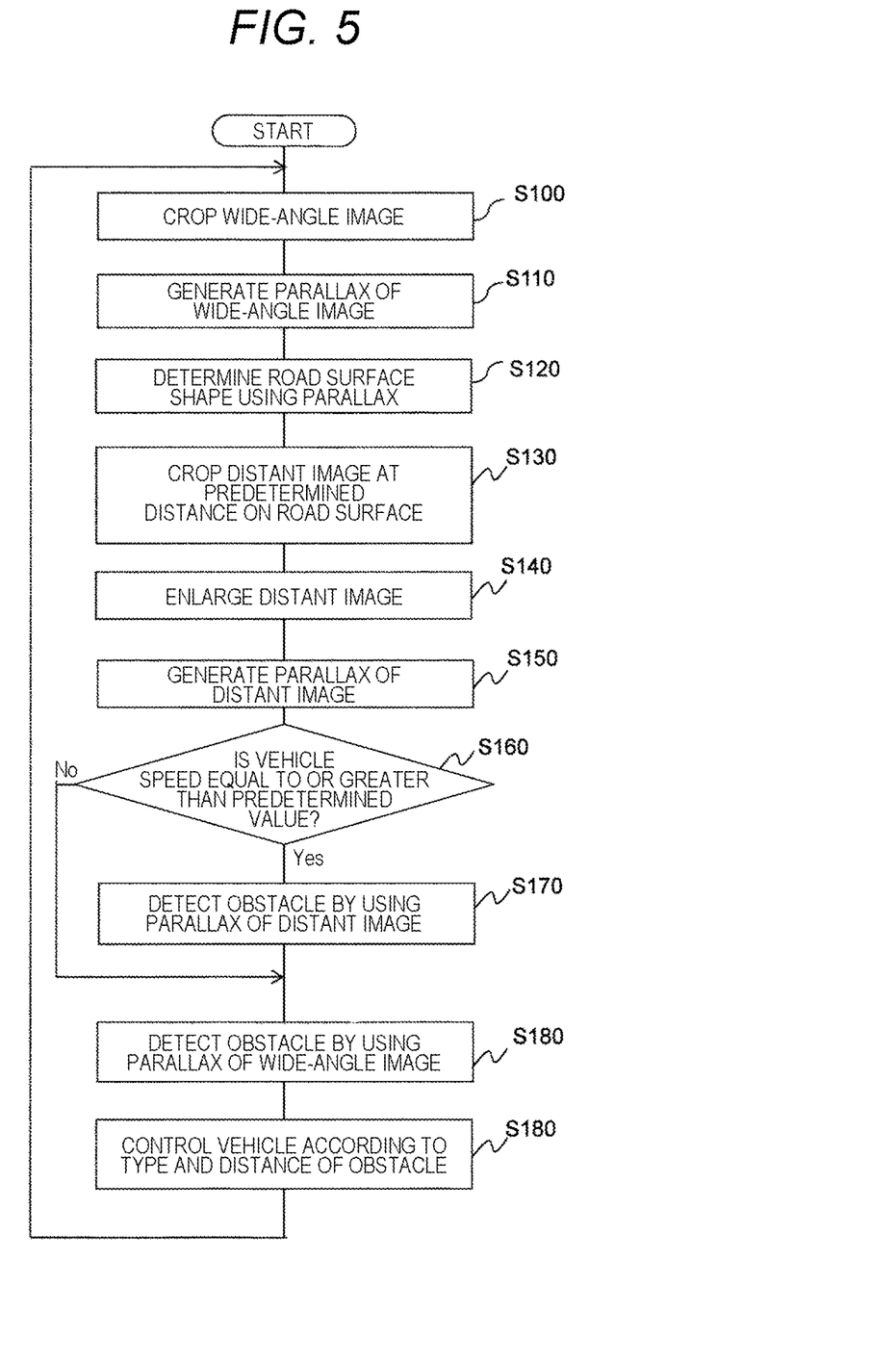
FIG. 5 is a flowchart for deciding a cropping position of the distant image.

FIG. 5 illustrates a flowchart of cropping processing of the distant image 110. First, the imaging unit 20 crops the image obtained after the noises of the images captured by the right camera 22 and the left camera 21 are removed and the distortions thereof are corrected by the wide-angle image cropping unit 30, reduces the image by the image reduction unit 40, and generates the wide-angle image 100 (S100). The disparity calculation unit 303 generates the disparity data by using the wide-angle image 100 (S110). The road shape determination unit 302 determines the shape of the road surface by the disparity data (S120). The distant image cropping unit 50 crops the image sent from the imaging unit 20 based on the determination result (S130). The cropped image is enlarged by an image enlargement unit 60 to a predetermined magnification, and thus, the distant image 110 (S140).

Thereafter, the disparity calculation unit 303 generates the disparity data of the distant image 110. Subsequently, the processing is changed according to a traveling speed of the host vehicle. It is determined whether or not the speed of the host vehicle is equal to or greater than a predetermined value (for example, 40 km/h) (S160). When the speed is equal to or greater than 40 km/h, it is determined that it is necessary to detect the preceding vehicle or the obstacle in the distance. Thus, the obstacle detection unit 304 detects the preceding vehicle or the obstacle by using the disparity data of the distant image 110 (S170). Subsequently, the obstacle detection unit 304 detects the preceding vehicle or the obstacle by using the disparity data of the wide-angle image (S180). When the speed is less than 40 km/h, the obstacle and the preceding vehicle are detected by using only the wide-angle image. The obstacle detection using the wide-angle image also detects a pedestrian and a bicycle jumping out of the road. As a result of the detection processing, an accelerator and a brake of the vehicle are controlled as needed (S180).

Figure 6:
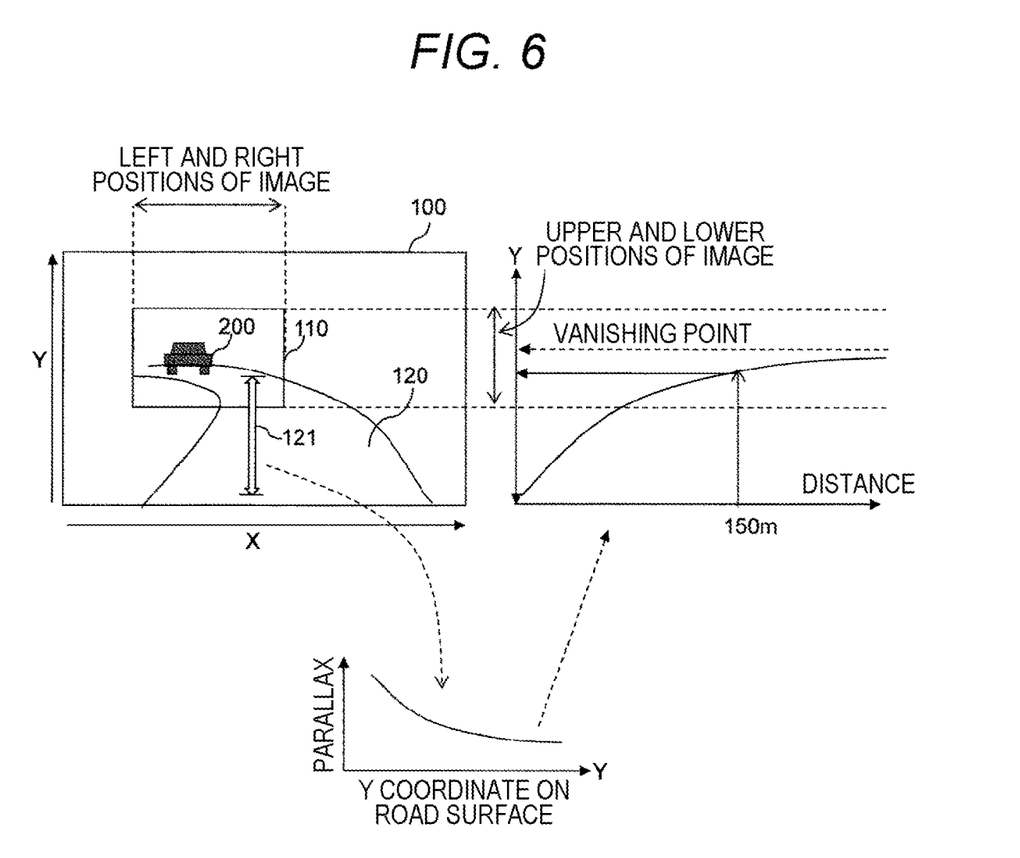
FIG. 6 is an explanatory diagram of deciding the cropping position of the distant image by determining a road shape from disparity information.

FIG. 6 illustrates a method of deciding the cropping position of the distant image by determining the road shape from disparity information in the processing of the road shape determination unit 302. First, a region of the road surface of the road 120 captured on the wide-angle image 100 is determined. Thus, disparity data of one pixel of any location on the road surface is extracted. Assuming that the road surface is a flat surface, a portion having the same disparity value in a horizontal direction of the one pixel can be considered as the road surface. When there is a block, grassland, or a groove on a road shoulder, a disparity value at this portion is different from the one pixel by a threshold value or more. An allowable variation range of the disparity value for determining the road surface is set as the threshold value. In this manner, left and right boundary points of the road surface can be known. When the same processing is performed while shifting the one pixel one by one, the boundary of the road surface can be detected. Left and right positions of the image are decided by using this boundary. In this example, since it is necessary to crop, as the distant image, the portion ahead by 150 m which is a measurement limit distance of the stereo camera device 10 in the distance, it is necessary to decide upper and lower positions on the image. As for the disparity data of the road surface in a vertical direction (for example, an arrow 121) in the image, a relationship between the distance and the disparity data is inversely proportional according to Equation (2). The Y coordinate on the image increases toward a vanishing point. The upper and lower positions including the portion at a predetermined distance of 150 m are decided from a relationship between the disparity data, the Y coordinate on the image, and the distance expressed in the following equation.

road surface $Y$ coordinate=vanishing point position $Y$ coordinate−camera height from road surface/(distance×$K$)  Equation (3)

Here, K is vertical size/focal distance of one pixel of the camera.

According to the above embodiment, there is an effect that the cropping position of the distant image near a limit position of the distance measurement of the stereo camera can be accurately cropped based on the road shape and the gradient.

Second Embodiment

Figure 7:
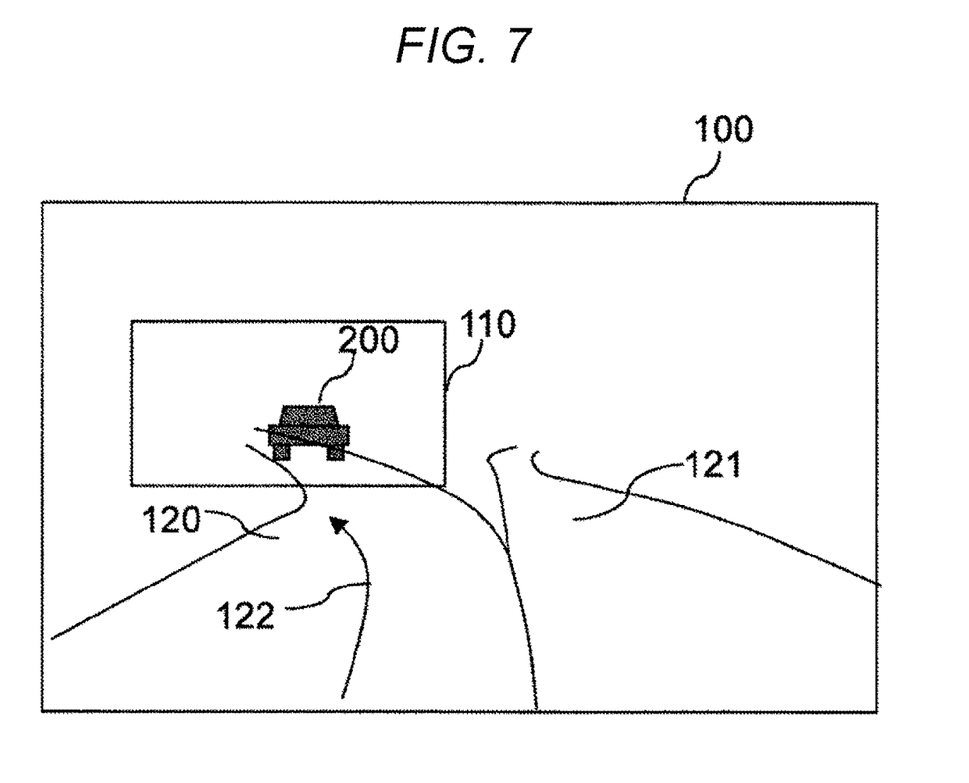
FIG. 7 is a diagram illustrating a case where the distant image is cropped according to a route when a traveling road branches off in the distance.

FIG. 7 illustrates a method of cropping the distant image when a traveling road branches off into a left side road 120 and a right side road 121. When the road branches off, it is not known in which direction the host vehicle is to travel by simply recognizing the road shape. In this case, the cropping position of the distant image 110 is decided by using map data and a route 122.

Figure 8:
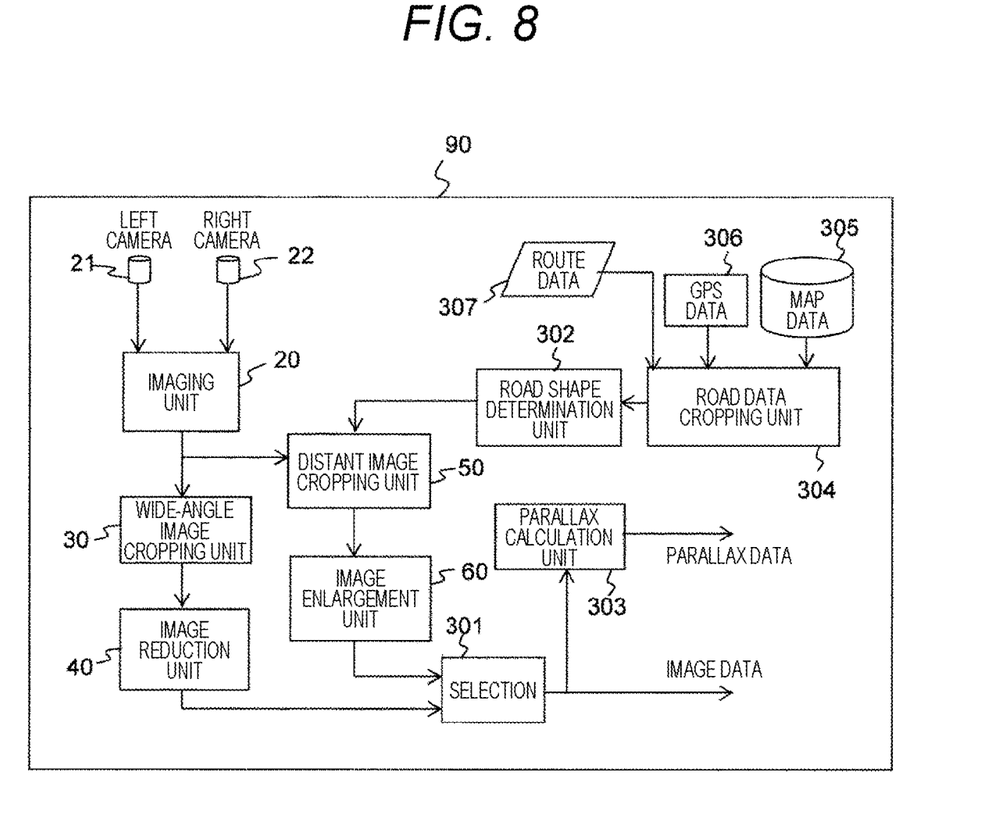
FIG. 8 is a functional block diagram for deciding the cropping position of the distant image using map data and route data.

FIG. 8 illustrates a configuration of a system that crops the distant image by using the map data and route data. Differences from FIG. 1 are that map data 305, GPS data 306, and route data 307 are included in the system. The map data 305 has information indicating the shape of the road such as a type, a shape, and gradient information of the road, and positional information based on latitude and longitude information. The GPS data sequentially updates a positioning result of the host vehicle position using satellite information as information on latitude and longitude and a traveling direction. The route data is data indicating a route to a destination, and has information such as a road on which the vehicle travels, a branch position, and a direction.

Figure 9:
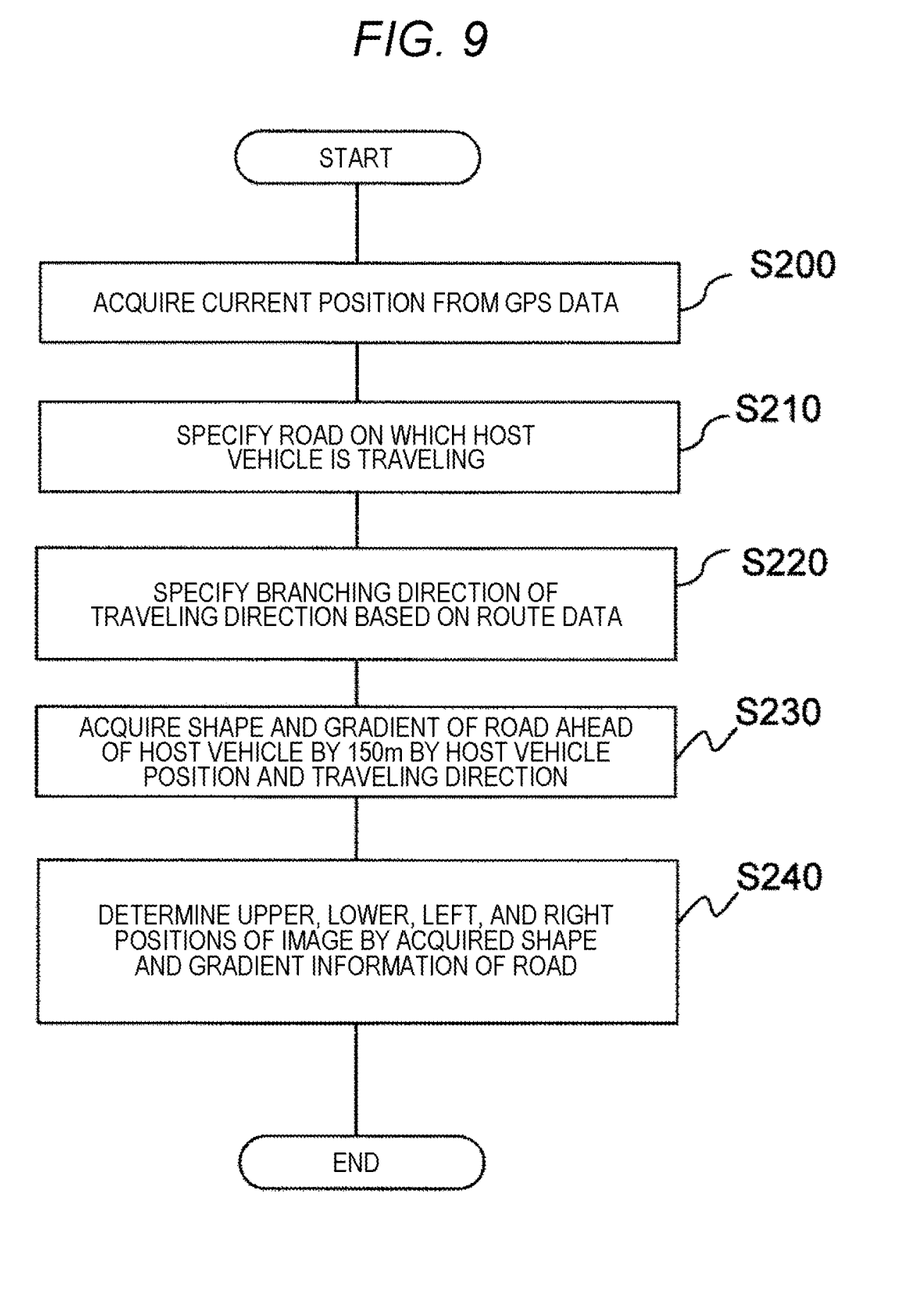
FIG. 9 is a flowchart for deciding the cropping position of the distant image using the map data and the route data.

FIG. 9 illustrates a processing flow of distant map cropping processing by using the map data and the route data. Latitude and longitude of a current location are acquired from the positioning result of the host vehicle using the GPS data 306 (S200). The road on which the vehicle is traveling is specified from the map data 305 based on the positioning result, and the road data is read (S210). A branching direction of the traveling direction is specified based on the route data (S220). Subsequently, the road shape and gradient data forward of the host vehicle are acquired based on the host vehicle position and the traveling direction (S230). The upper, lower, left, and right positions in the wide-angle image 100 for cropping the distant image 110 are determined by the road shape and the gradient information acquired in this manner.

According to the above embodiment, there is an effect that the cropping position of the distant image can be accurately decided even when the road on which the vehicle is traveling branches off.

Third Embodiment

Figure 10:
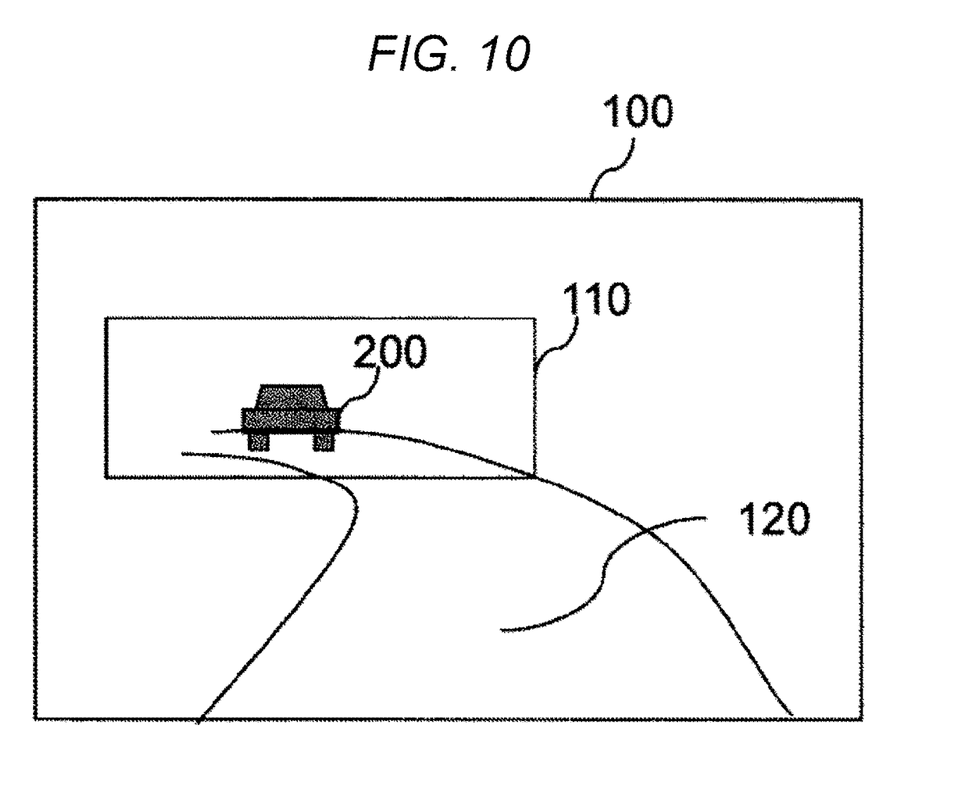
FIG. 10 is a diagram in which a cropping width of the distant image is changed according to the road shape.

FIG. 10 illustrates an example in which a cropping width of the distant image 110 is changed according to the curve of the traveling road 120. For the distant image 110, the distant image is cropped from a central portion of the wide-angle image 100 to a distant portion of the road. When a processing time of the disparity calculation increases due to an increase in a horizontal width of the distant image, the vertical direction may be narrowed, and thus, an area of the distant image may not increase. The size and resolution may be changed by enlarging the image cropped according to the host vehicle speed. The resolution in the distance becomes higher as the host vehicle speed becomes faster, and thus, safety can be improved by easily detecting the obstacle in the distance during high-speed traveling.

According to the above embodiment, since both the distant portion of the traveling road and the distant portion of the central portion of the image can be measured, a distant obstacle having a wider range can be detected.

The present invention is not limited to the aforementioned embodiments, and includes various modification examples. For example, the aforementioned embodiments are described in detail in order to facilitate easy understanding of the present invention, and are not limited to necessarily include all the described components. Some of the components of a certain embodiment can be substituted into the components of another embodiment, and the components of another embodiment can be added to the component of a certain embodiment. In addition, the components of another embodiment can be added, removed, and substituted to, from, and into some of the components of the aforementioned embodiments.

REFERENCE SIGNS LIST 10 stereo camera device
20 imaging unit
21 left camera
22 right camera

40 image reduction unit
50 distant image cropping unit
60 image enlargement unit
100 wide-angle image
110 distant image
301 selection unit
302 road shape determination unit
303 disparity calculation unit
304 obstacle detection unit
305 map data
306 GPS data
307 route data
2110 left image
2210 right image

The invention claimed is:

1. A stereo camera device that measures a distance of a three-dimensional object from images captured by a plurality of cameras, comprising:
   a wide-angle image cropping unit that crops a part of the image;
   a distant image cropping unit that crops a part of the image, and enlarges the cropped part; and
   a road shape determination unit that determines a road shape including gradient information of a road on which a vehicle is traveling,
   wherein at least any one of a cropping position and a cropping range of the distant image cropping unit is decided based on the road shape at a predetermined distance which is obtained by the road shape determination unit.

2. The stereo camera device according to claim 1, wherein the road shape determination unit determines a shape of a road surface on which the vehicle is traveling by using disparity information generated from a wide-angle image cropped by the wide-angle image cropping unit.

3. The stereo camera device according to claim 1, wherein the road shape is information on a shape and a gradient of the road using map information.

4. The stereo camera device according to claim 1, wherein
   route data that stores a traveling route of a host vehicle is provided, and
   the distant image cropping unit generates the distant image on a traveling road by using route information of the route data.

5. The stereo camera device according to claim 1, wherein the distant image cropping unit generates the distant image obtained by enlarging a curve direction of the road obtained by the road shape determination unit.

6. The stereo camera device according to claim 1, wherein the distant image cropping unit changes a size or a resolution of the distant image according to a host vehicle speed.

* * * * *